March 31, 1970 SHIGERU KAMIYA 3,503,780
FLUX SUBSTANCE AND METHOD FOR COATING WITH
FLUORESCENT SUBSTANCES
Original Filed Dec. 8, 1961
FIG. 2
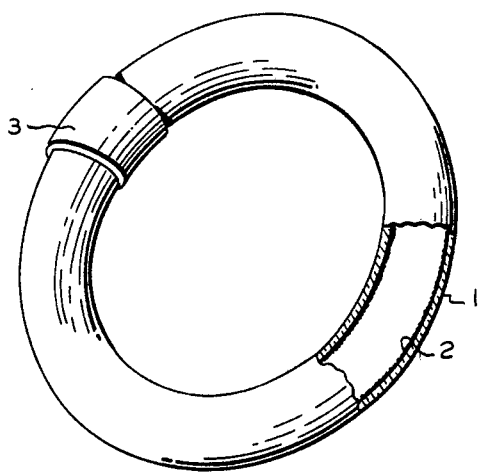
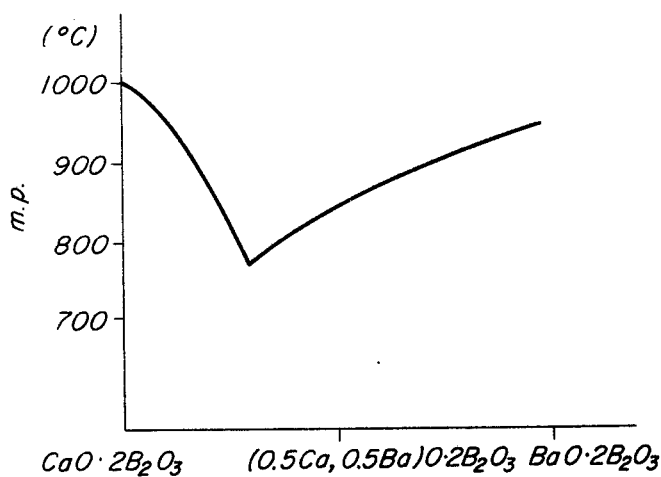
FIG. 1
INVENTOR
SHIGERU KAMIYA

| United States Patent Office | 3,503,780
Patented Mar. 31, 1970 |

3,503,780
FLUX SUBSTANCE AND METHOD FOR COATING WITH FLUORESCENT SUBSTANCES
Shigeru Kamiya, Hirakata-shi, Osaka, Japan, assignor to Matsushita Electronics Corporation, Osaka, Japan, a corporation of Japan
Continuation of application Ser. No. 158,039, Dec. 8, 1961, which is a continuation-in-part of application Ser. No. 60,724, Oct. 5, 1960. This application Sept. 26, 1966, Ser. No. 582,163
Claims priority, application Japan, Dec. 10, 1960, 35/48,927
Int. Cl. H01j 61/35
U.S. Cl. 117—33.5            8 Claims

ABSTRACT OF THE DISCLOSURE

A compound having the general formula:

$$m\text{CaO} \cdot n\text{BaO} \cdot 2\text{B}_2\text{O}_3$$

wherein $m+n$ is 1 and $m$ is 0.2 to 0.8, an improved method for coating an inner glass wall of an electric gas discharge lamp by applying thereto a suspension of a fluorescent substance and said compound as a flux in an organic medium, drying and heating until the fluorescent layer is strongly bonded to the glass wall, and electric gas discharge lamps so produced.

---

This application is a continuation of application Ser. No. 158,039, filed Dec. 8, 1961, now abandoned, which is a continuation-in-part of application Ser. No. 60,724, filed Oct. 5, 1960, now abandoned.

This invention relates to a flux substance and a method for coating an inner surface of an electric gas discharge lamp of circular or more complicated shapes with fluorescent substances which are hardly peeled off the inner surface thereof.

More particularly, it relates to a new flux composition used with the fluorescent substance suspension to improve the adhesive property thereof.

In the manufacture of the circular electric gas discharge lamp, the inner surface of the linear glass tube is first coated with fluorescent substances and then softened by heat to form a desired shape. It is the most undesirable in above operation that the fluorescent substances coated are peeled off the inner surface of the glass tube of the electric gas discharge lamp, so that the outlook thereof will be ugly and the grade of lightness will decrease.

Many methods were proposed herebefore to prevent the above disadvantages, but no sufficient results have been obtained. For instance, firstly the fluorescent suspension prepared by suspending the fluorescent substances in a viscous solution of nitrocellulose in acetic ester was painted on the inner surface of the glass tube, and then dried at room temperature or in the atmosphere of hot air. Thereafter a boric acid solution or suspension was painted or coated thereon, followed by a subsequent heat treatment to fuse boric acid, thereby a glassy state was formed and the fluorescent substance was firmly bonded to the inner surface. By this method an excellent bonding between the fluorescent layer and the inner surface of the glass tube could be obtained, but water involved in boric acid could not completely be removed by the above heat treatment. What is more, degree of vacuum within the glass envelopes of electric gas discharge lamp decreased gradually by decomposition of the water due to ionic bombardment during lighting, by which, a considerable stain appeared in and on the fluorescent layer and the maintenance of a beam was made lower.

Secondly, another method of bondings between the fluorescent substance and the glass surface or between the fluorescent substances each other was carried out by applying and heating a coating mixture prepared by mixing the fluorescent suspension with a flux which melts adhesively by heat treatment after the coated layer had been dried thoroughly. In such a flux heretofore suggested, zinc borate, cadmium borate, calcium borate etc. are included. They were not satisfactory when used as a flux in the production of the glass envelopes of electric gas discharge lamps. For example, zinc borate or cadmium borate reduces lightness of lamp and calcium borate had an insufficient adhesion when coated on the glass surface.

According to the present invention we use new flux compositions of $m\text{CaO} \cdot n\text{BaO} \cdot 2\text{B}_2\text{O}_3$ wherein $m+n$ is 1 and $m$ is 0.2–0.8, by which the abovementioned disadvantages can be overcome. The invention relates to the composition, the method of preparation and the use of the flux.

A specific embodiment of the invention is shown in FIG. 2 which shows an electric discharge lamp having a torus-shaped glass envelope 1, covered on the inside with a fluorescent layer 2 containing a flux composition comprising CaO, BaO and $B_2O_3$ and a socket 3 containing contact pins on the side remote from the observer.

The requirements for a flux are summarized below:

(1) In the first place, the melting point of the flux should be within the range of 600°–900° C., as there is an organic binding agent in the fluorescent suspension such as nitrocellulose, which can not be burnt off completely at a temperature below 600° C. When a flux melts below 600° C., carbon particles are formed by decomposition of nitrocellulose and wrapped in a melted flux before ignition of nitrocellulose to carbon monoxide or carbon dioxide, with the result of colouring the fluorescent layer. Thus, the glass envelopes of electric gas discharge lamps prepared by using such a flux have a poor light intensity.

In the working of the glass tubes the heating temperature must be maintained below 900° C., and therefore any substances melting at the temperatures above 900° C. may not use as a flux.

(2) Secondly, the flux must have a high reflection index for ultraviolet rays, particularly for the radiation having a wave-length of 2537 A. If there is absorption band in ultraviolet zone, the ultraviolet radiation will be absorbed by the flux and not by the fluorescent substances, thereby the radiation energy will not change to a visible light and consequently the luminous efficiency of the discharge tubes is reduced as a whole.

(3) Thirdly, it should be chemically stable and must not undergo any changes in the course of the lighting operation of the discharge tubes. The materials which fulfill these requirements are usually inorganic crystalline substances.

Above-described zinc borate and cadmium borate are satisfactory in above-mentioned properties (1) and (3), but not in the property (2). These substances have an absorption band in the ultraviolet zone, and therefore the glass envelopes of electric gas discharge lamps having the fluorescent coating consisted thereof have a poor illuminating power. Calcium borate is satisfactory in the properties (2) and (3), but not in the property (1). It can not be used as a component of flux compositions having melting point below 900° C., even in any ratios of CaO to $B_2O_3$.

I have found a composition comprises CaO, BaO and $B_2O_3$ in a definite ratio, which is satisfied with the abovementioned properties. The composition has the general formula of $m\text{CaO} \cdot n\text{BaO} \cdot 2\text{B}_2\text{O}_3$, wherein $m+n=1$ and $m=0.2$–0.8.

The present substances of $m=0-1$ expressed by the above formula are white crystalline powder melt within the range of about 750°–1000° C., and have substantially no absorption band in both ultraviolet and visible zones. As illustrated in FIG. 1, the substances having $m=0.2-0.8$ melt in the range of 600°–900° C. and fulfill a useful purpose as a flux.

It will be seen from FIG. 1 that most preferable result is achieved when $m$ is 0.7, and the value $m=0.5-0.8$ is also practicable. The melting point of the flux corresponding to $m=0.7$ is about 750° C. The flux is hardly soluble in water, alcohols, acetic esters and aromatic solvents, but soluble well in diluted acids.

The flux is generally produced by methods well known to one skilled in the fluorescent substance production art, i.e. the previously refined materials such as carbonates, nitrates, oxides, ammonium salts or inorganic acid containing the elements of calcium, ballium and boron are mixed each other and calcined in an electric furnace at 650°–800° C. in an oxidation atmosphere, after that the calcined mass is ground in a ball-mill.

The following examples illustrate the details of this invention, but the embodiments do not limit the invention.

EXAMPLE 1

0.8 mol of calcium carbonate, 0.2 mol of barium carbonate and 2 mol of boric acid (each was refined) were mixed and ground in a ball-mill. The mixture was put in a quartz crucible and calcined for two hours at the temperature 800°–850° C. in an electric furnace. The calcined mass was ground in a ball-mill.

EXAMPLE 2

2 mol of boric acid, 0.7 mol of calcium nitrate and 0.3 mol of barium nitrate (each was refined) were put in an evaporating dish and eveporated to dryness on a gas burner until no nitric oxide evolved. After the mixture was ground in a ball-mill about one hour, the resulting mixture was charged in a quartz crucible and calcined for two hours in an electric furnace at 650°–700° C. Again the calcined mass was ground in a ball-mill.

EXAMPLE 3

0.5 mol of calcium oxide, 0.5 mol of barium oxide and 0.5 mol of ammonium tetraborate were thoroughly mixed. The mixture was put in a quatrz crucible and calcined for two hours in an electric furnace at 750°–800° C. The resulting mass was ground to powders in a ball-mill.

As above illustrated, the flux in the present invention are obtained readily by mixing the materials as to meet a desired composition followed calcining. Preferably, materials for calcium oxide are calcium oxide, calcium carbonate and calcium nitrate etc., materials for barium oxide are barium oxide, barium carbonate and barium nitrate etc., materials for boron oxide are boric acid and ammonium borate.

The temperature and the time of calcining are not critical in comparison with that of the fluorescent substances. When required, materials may be calcined repeatedly and no effects are exterted on the properties of the resulting flux.

The percentage of the flux to be mixed with the fluorescent substance is preferably chosen in the range of about 3–15%. Below 3% generally, the adhesive power is somewhate insufficient, and it is unnecessary to use more than 15%. But the percentage is not critical and decided when required. For instance, the desired adhesive power may be changed according to the degree of reforming by the heat treatment. When the circular electric gas discharge lamps are produced, the radius of the torus is varied according to watt of the lamp. In the reforming by the heat treatment, the fluorescent substances will tend to peel off the glass surface as the radius of curvature of the torus is smaller, thereby a stronger adhesive power is required. Amount of the flux to be mixed with the fluorescent substance for the circular electric gas discharge lamps of standard size is as follows:

| Radium of curvature | Amount of flux to be mixed, percent | Remarks |
|---|---|---|
| Above 20 cm | 3–5 | |
| Do | 5–8 | 40 w. Circular electric gas discharge lamp. |
| Above 15 cm | 7–10 | 32 w. Circular electric gas discharge lamp. |
| Above 10 cm | 9–12 | 22 w. Circular electric gas discharge lamp. |
| Below 10 cm | 12–15 | |

The amount shown in this example was not affected no matter what material is employed for fluorescent body, and same favourable result was obtained employing calcium halophosphate, zinc silicate, calcium silicate, magnesium tungstate and calcium tungstate in the amount as before.

The above stated table illustrates the circular electric gas discharge lamps, which applies identically to the lamps having the similar radius of curvature. When a substance is generally used as a flux according to this invention, the preferable amount thereof is 3–15% by weight.

It may be probable that the flux is used in a larger amount to increase an adhesive power, but using a large excess of the flux will be unnecessary and rather unfavorable economically, furthermore will decrease the lighting effect. The flux is itself will not be luminous by ultraviolet radiation, and it is undesirable that the fluorescent substances contain substantially too much amount of such a flux.

As above-mentioned, the fluorescent substance mixed with the present flux is applied to the inside of the glass envelope, and by heat treatment the fluorescent substance is bonded thereto. A binding agent such as nitrocellulose may be present in the suspension.

The bond between the fluorescent layer and the glass is very strong so that the coated glass tube may be subjected to subsequent heat treatment, necessary for instance for bending the tube into a desired form e.g. toroidal form without any tendency for the layer to peel off.

The melting points of the present flux is between 750° C. and 1000° C., and there are no difficulties to be feared when an organic binder such as nitrocellulose is used, because such binder is completely burnt away at these temperatures. The glass, on which the coating is applied, will not be adversely affected by these temperatures. Furthermore, no staining or blackening will arise in the course of operation of the discharge lamps.

The fluorescent substances include calcium halophosphate activated by antimony and manganese, zinc silicate activated by manganese, calcium silicate activated by lead and manganese, and magnesium tungstate or calcium tungstate.

When the electric gas discharge lamps prepared by the coating of the fluorescent suspension containing the present flux are lighted, no staining and blackening are seen in the fluorescent layer, which are seen when a flux of boric acid is used, nor is spoiled beam value which is seen when zinc borate or cadmium borate is used as the flux. The characteristics of circular fluorescent lamp manufactured by introducing flux of instant invention and other flux into calcium halophosphate fluorescent body (4500° K.) is as indicated in the following table.

| Coating | Lightness, percent | | |
|---|---|---|---|
| | Initial (0 hr.) | After 100 hrs. | After 500 hrs. |
| Boric acid | 98 | 86 | 80 |
| Cadium borate | 90 | 84 | 81 |
| This invention | 100 | 95 | 92 |

Boric acid coating hereinabove means that the saturated solution of boric acid dissolved in acetone was painted after the fluorescent substance was coated. In the cadmium borate coating and in this invention the flux was mixed in the amount of 10% to the fluorescent substance.

I claim:
1. A compound having the general formula:

$$mCaO \cdot nBaO \cdot 2B_2O_3$$

wherein $m+n$ is 1 and $m$ is 0.2 to 0.8.

2. In a method for coating an inner surface of an electric gas discharge lamp with a fluorescent layer by applying a suspension of a fluorescent substance in an organic medium on the inside glass wall of the lamp, drying and heating at a temperature of 750° to 900° C. until the fluorescent layer is strongly bonded to the glass wall, the improvement which comprises incorporating in the suspension from 3 to 15% by weight of the fluorescent material of a flux compound having the general formula:

$$mCaO \cdot nBaO \cdot 2B_2O_3$$

wherein $m+n$ is 1 and $m$ is 0.2 to 0.8.

3. A method according to claim 2 wherein the flux is one wherein $m$ is 0.7.

4. A method according to claim 2 wherein the suspension contains a binder of nitrocellulose.

5. A method according to claim 2 wherein the fluorescent material is selected from the group consisting of antimony and antimony-activated calcium halophosphate, manganese-activated zinc silicate, lead and manganese-activated calcium silicate, magnesium tungstate and calcium tungstate.

6. A method for preparing the compound of claim 1 which comprises mixing three members containing boron, calcium and barium respectively and selected from the group consisting of ammonium tetraborate, boric acid, calcium oxide, calcium carbonate, calcium nitrate, barium oxide, barium carbonate and barium nitrate in amounts sufficient to produce upon calcining a compound having said formula, and calcining the mixture at 600°–800° C.

7. An electric gas discharge lamp having at least one surface coated with a fluorescent layer bonded to said surface by a compound having the general formula:

$$mCaO \cdot nBaO \cdot 2B_2O_3$$

wherein $m+n$ is 1 and $m$ is 0.2 to 0.8.

8. An electric gas discharge lamp according to claim 7 wherein the lamp is in the form of torus.

References Cited

UNITED STATES PATENTS

| | | | |
|---|---|---|---|
| 2,238,777 | 4/1941 | Lemmers | 65—60 XR |
| 2,774,737 | 12/1956 | Mager | 252—301.3 |
| 2,905,572 | 9/1959 | Jones | 117—33.5 |

ALFRED L. LEAVITT, Primary Examiner

W. F. CYRON, Assistant Examiner

U.S. Cl. X.R.

106—313; 252—301.4, 301.5, 301.6